Oct. 22, 1935.  J. L. ROTH  2,018,035
REGULATING APPARATUS
Filed April 3, 1934  3 Sheets-Sheet 1
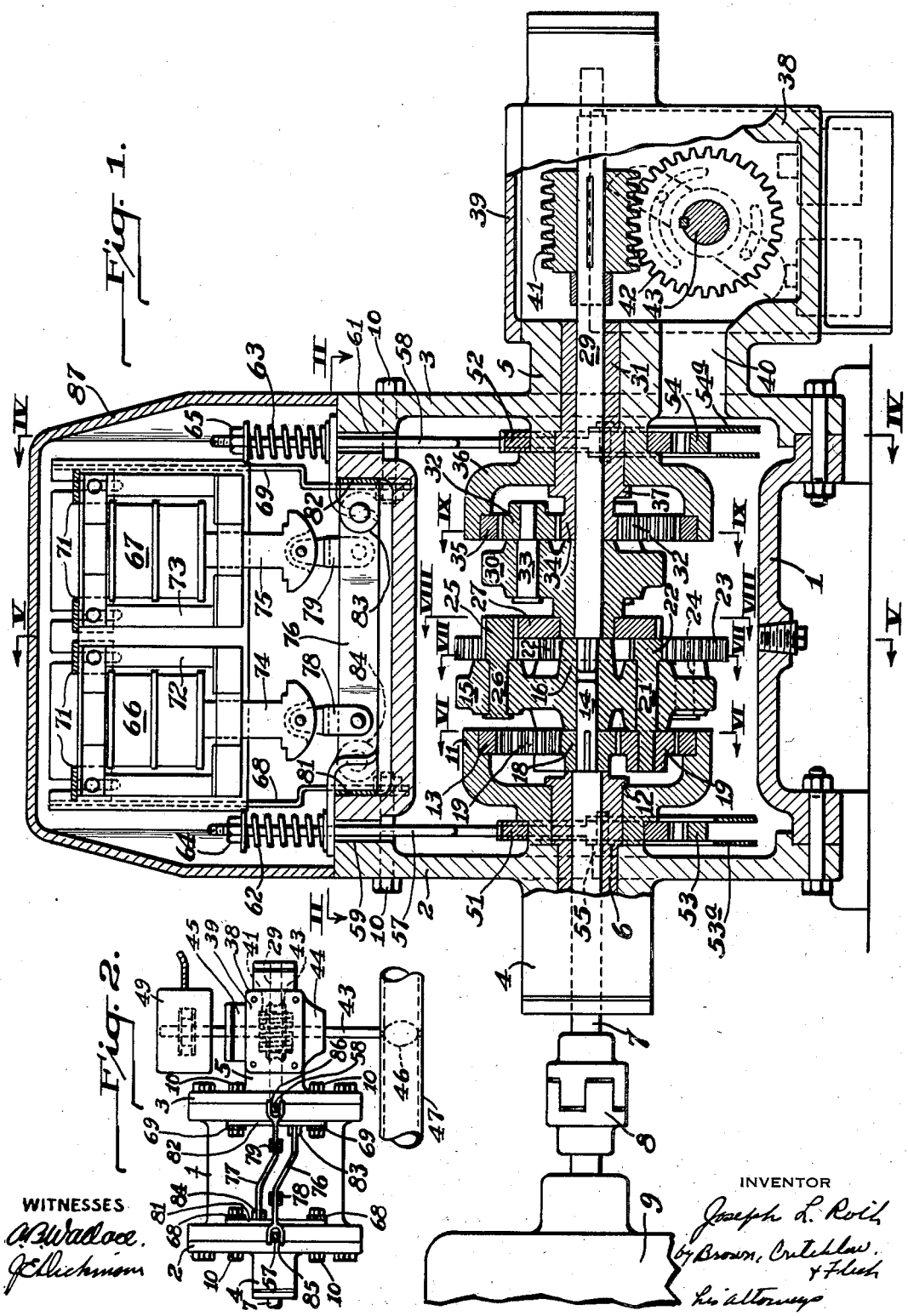
INVENTOR
Joseph L. Roth
by Brown, Critchlow
& Flesh
his attorneys
WITNESSES Oct. 22, 1935.   J. L. ROTH   2,018,035
REGULATING APPARATUS
Filed April 3, 1934   3 Sheets-Sheet 2

INVENTOR
Joseph L. Roth
by Brown, Critchlow & Flick
his attorneys

Patented Oct. 22, 1935

2,018,035

UNITED STATES PATENT OFFICE 2,018,035

REGULATING APPARATUS

Joseph L. Roth, Wheeling, W. Va.

Application April 3, 1934, Serial No. 718,804

14 Claims. (Cl. 137—164)

This invention relates to a proportioning or regulating apparatus, and more particularly to a regulator of the type used for controlling the flow of air and/or fuel to the combustion chamber of a heating furnace, although it is not necessarily so limited in its use, as will be readily appreciated from the following description.

An object of the invention is to provide a regulator of this character which is simple and sturdy of construction, efficient and dependable in operation, and adapted to function with great accuracy and sensitivity.

A further object is to provide a flow or pressure-controlling regulator equipped with a continuously operated driving element and a selectively responsive reversibly operable driven element which is coupled to the regulating element proper and adapted to be rendered operative by either a simple pressure, temperature or flow-responsive control mechanism depending upon the form of regulation desired.

Figure 5:
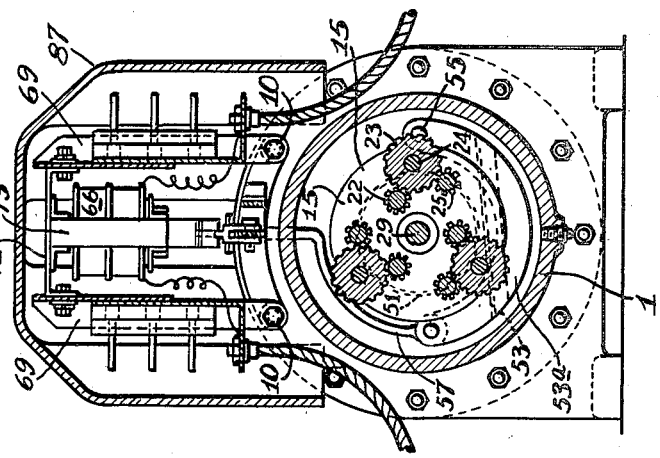
Figure 4:
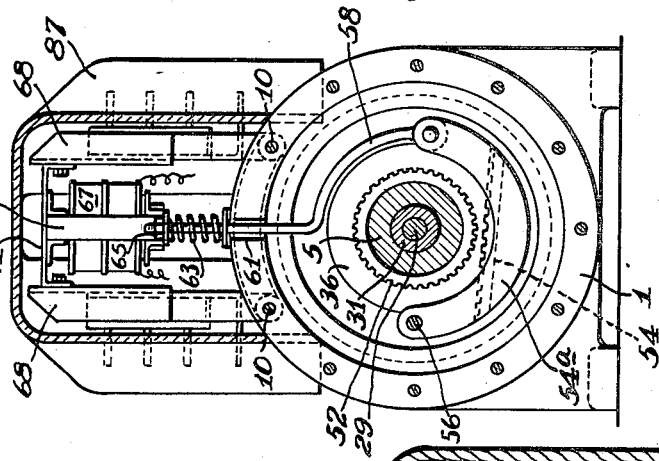
Figure 3:
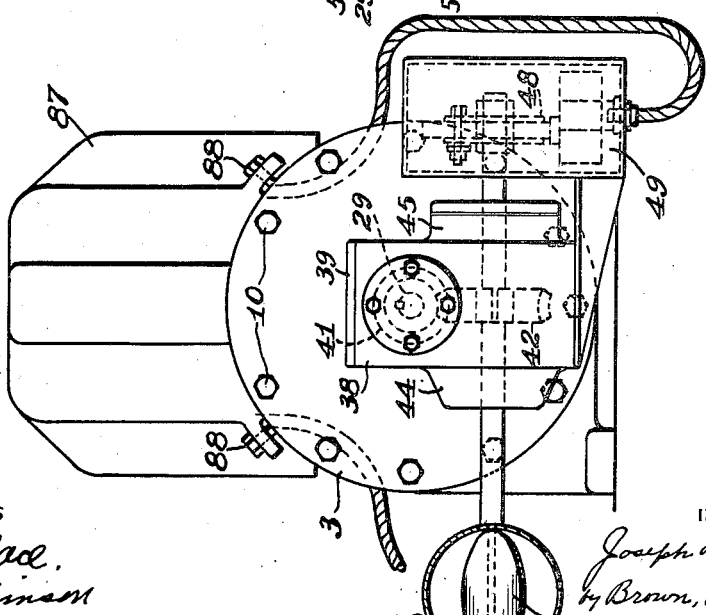
Figure 6:
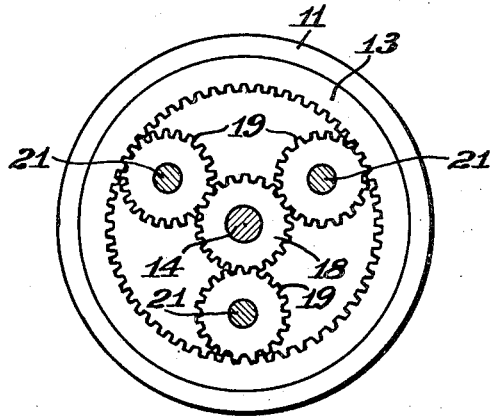
Figure 7:
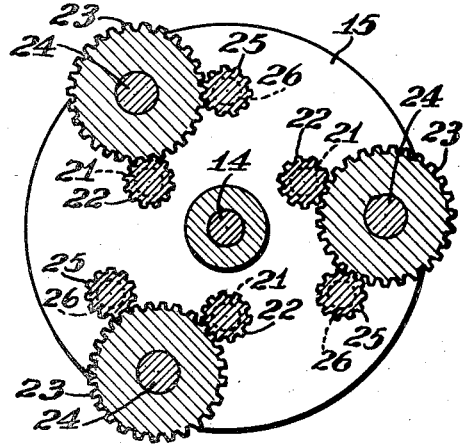
Figure 8:
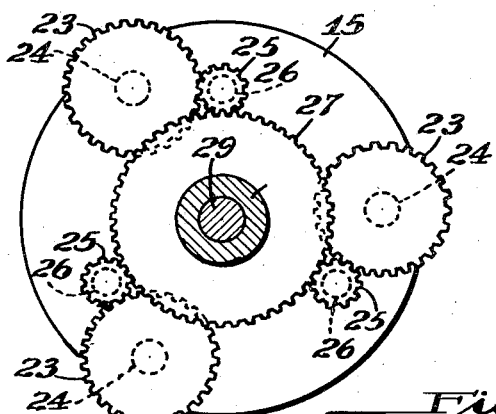
Figure 9:
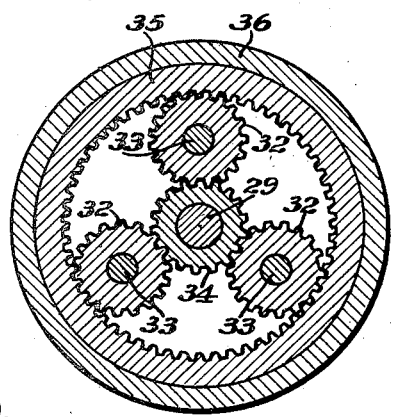

These and various other objects, as well as the various other novel features of the invention, will be apparent when the following detailed description is read in conjunction with the accompanying drawings, of which Fig. 1 is a vertical sectional view taken through the axes of a regulator constructed in accordance with the invention; Fig. 2 a horizontal section taken on the line II—II of Fig. 1; Fig. 3 an end elevation of the apparatus shown in Fig. 1 looking toward the driving end thereof; Fig. 4 a vertical section taken on the line IV—IV of Fig. 1; Fig. 5 a vertical section taken on the line V—V of Fig. 1; Fig. 6 a vertical section taken on the line VI—VI of Fig. 1; Fig. 7 a vertical section taken on the line VII—VII of Fig. 1; Fig. 8 a vertical section taken on the line VIII—VIII of Fig. 1; Fig. 9 a vertical section taken on the line IX—IX of Fig. 1; and Fig. 10 a schematic wiring diagram of the electrical control circuits and controlling apparatus comprising a part of the regulator.

Referring in detail to the invention as illustrated in the drawings, the numeral 1 designates a cylindrical casting which comprises the housing and supporting frame of the regulator proper. At the two ends of this housing there is provided a pair of removable cover plates 2 and 3, respectively which are held in place by suitable bolts 10. In the center of such plates is a pair of shaft-supporting hubs 4 and 5 equipped with tightly fitted sleeve-shaped bearings 6 and 31 wherein a drive shaft 7 and an aligned driven shaft 29, respectively, are journalled, the former being connected by a coupling 8 to a continuously operated driving motor 9.

On the inner end of the bearing sleeve 6 in which the drive shaft 7 is journaled there is mounted a ring gear 11 which is held in place by a shoulder 12 provided at the innermost end of such sleeve. This gear, as shown best in Fig. 1, is made somewhat in the shape of a bowl and provided interiorly at its inner edge with an internal gear 13. Next to it a pinion 18 is keyed to a reduced portion 14 of the drive shaft 7 and meshed with three radially disposed intermediary gears 19 which are also meshed with the aforementioned ring gear 13. These latter gears 19 which are spaced 120° apart are mounted on shafts 21 carried by a gear supporting ring 15 loosely mounted on the end of the drive shaft 7 (see Fig. VI). As shown, this gear ring has a fairly long hub 16 and the reduced portion 14 of the shaft 7 is extended only a portion of the way through it, the remaining part of such hub being occupied by the inner end of the driven shaft 29 to which it is keyed.

On the driven side of the gear ring 15 opposite to the intermediary gears 19 the supporting shafts 21 are equipped with relatively small gears 22 which are keyed thereto and meshed with three similarly spaced but somewhat larger radially aligned gears 23, carried on a plurality of stub shafts 24 mounted in the outer portion of the gear ring 15, as shown best in Fig. 7. These latter gears are in turn meshed with three gears 25 of about the same diameter as the gears 22, which are mounted on stub shafts 26 also journaled in the gear ring 15, and, as shown in Fig. 1, they have a length equal substantially to twice the length of the gears 23, being extended beyond such gears and meshed with a large gear 27 which is keyed to the hub of a second gear-supporting ring 30 loosely mounted in concentric alignment with the first-mentioned gear ring 15 on the driven shaft 29. On the opposite side of this latter gear ring 30 three intermediary gears 32, which are mounted on shafts 33 journaled in such ring, are meshed with a rigid gear 34 formed on the inner end of the bearing sleeve 31 and with the internal gear face 35 of a bowl-shaped ring gear 36 mounted loosely on the bearing sleeve 31 and held in place by a shoulder 37 provided for such purpose on this sleeve.

The driven shaft 29 as shown in Figs. 1 and 3 is provided at its outer end with a keyed worm 41 which is meshed with a worm gear 42 mounted on a regulator operating shaft 43. This latter shaft is disposed at right angles to the driven shaft 29 and journaled in the walls of an auxiliary housing 38 which comprises an integral part of the housing end cover plate 3. To facilitate the assembly of these latter gears and provide for filling both the auxiliary and the main housing with lubricating oil a removable cover plate 39 is provided on the top of such housing and its interior is connected with the interior of the main housing 1 by a duct 40 through which the lubricant is conducted into the main housing, the lubricant being supplied in the two housings in a sufficient quantity to form a bath for all the moving parts located in them.

In the present embodiment of the invention the regulator operating shaft 43 is connected directly at one end to a butterfly valve 46 located in a supply main 47 which is here assumed to be the air supply to the combustion chamber of a heating furnace. At its other end a limit switch designated generally by the numeral 49 is connected to this shaft and employed, as will be presently described, for limiting the movement of the valve 46. As will be readily appreciated, this switch as well as the valve and valve connection may be variously modified to conform with different requirements of the regulator.

In the operation of the aforementioned structure so long as the ring gears 11 and 36 are permitted to move with freedom about their bearing supports no movement is imparted by the continuously actuated motor 9 to the driven shaft 29 and the regulator shaft 43. However, as will be presently described in more detail, when one of the ring gears is held against rotation the driven shaft 29 is caused to rotate in one direction, and when the other is so held it is rotated in the opposite direction. For so controlling the movement and direction of rotation of the driven shaft 29 a normally inoperative braking mechanism is provided for each of the ring gears 11 and 36. As will be apparent to those skilled in the art, various forms and kinds of brakes may be employed for this purpose, although a novel form is provided in the present embodiment of the invention which comprises a pair of gears 51 and 52 keyed to the outer edges of the hubs of the gears 11 and 36, respectively. Cooperating with these gears is a pair of gear racks 53 and 54 which are carried by semi-circular cradle-like supports 53a and 54a pivotally attached at one end by pins 55 and 56 to the end covers 2 and 3. The opposite ends of these cradles are pivotally secured to rods 57 and 58 which are utilized for lifting the gear rack into contact with the brake gears. These rods are curved about the hubs of the brake gears and projected upwardly through openings 59 and 61 formed between the body 1 of the housing at the top thereof and the covers 2 and 3.

For normally supporting the gear racks 53 and 54 below the brakes 51 and 52, respectively, the brake rods 57 and 58 are projected above the housing and equipped with coil springs 62 and 63, which bear against the housing, and nuts 64 and 65 threadably secured to the ends of such rods. These nuts are utilized to raise or lower the brake rods so as to properly position the brake racks 53 and 54 just out of contact with the brake gears and thereby minimize the movement required to engage and disengage them. To effect this movement, although other means may be employed for such purpose, a pair of solenoids 66 and 67 is provided. These, as shown, are supported between a plurality of uprights 68 and 69 secured to the top of the housing by the bolts 10 which hold the end plates 2 and 3 to the main casting 1. At the top of these uprights 68 and 69 there is secured a plurality of cross pieces 71 to which the frames 72 and 73 housing the solenoids 66 and 67 are attached.

The armatures (not shown) which are associated with the solenoids 66 and 67 are connected respectively to a pair of plungers 74 and 75, and these in turn connected by suitable connecting links 78 and 79 to a pair of pivotally mounted actuating levers 76 and 77. As shown best in Figs. 1 and 2, pivotal end supports for these levers 76 and 77 are provided by a pair of strap members 81 and 82 which are secured to the inner ends of the bolts 10 utilized to hold the solenoid supporting uprights 68 and 69 in place, such straps being provided with hinge-forming bosses 83 and 84 in which the ends of the levers 76 and 77 are pivotally mounted. These levers, as shown, are bent in such a way as to permit the connecting links 78 and 79 to be attached to them in alignment directly below the solenoids 66 and 67, and at their outer ends they are provided with slots 85 and 86 by means of which they are fitted on the rods 57 and 58 below the lower ends of the springs 62 and 63. Consequently when the solenoids are actuated the gear racks are resiliently moved into engagement with the brake gears 51 and 52 due to the use of the springs 62 and 63 which function as a cushion for the brake mechanism. The advantage of this will be more fully appreciated when it is considered that the solenoid plungers have a fixed limit of travel and that the racks 53 and 54 engage the brake gears 51 and 52 before the end of such travel is reached on energization of the solenoids. The remaining travel of the plungers is absorbed by these springs, which reduce the shock on the solenoids and allow them to seat instantly at all times. Also, in the event the brake gears and racks clash momentarily the compressed springs complete the upward movement of the racks as soon as the teeth mesh, making the engagement certain.

When the solenoids are deenergized, the brake mechanism drops by the action of gravity, and as will be apparent, since the speed of the brake gears is much lower than the speed of the motor, and the braking operation is only to hold the ring gears 11 and 13 from turning, the wear on the rack and gear teeth is negligible.

To protect the solenoids and other brake-operating mechanism mounted on the top of the differential unit from dirt and injury, a suitable cover 87 is provided which is adapted to completely enclose such parts and is secured to the body of the housing by suitable bolts 88.

Figure 10:
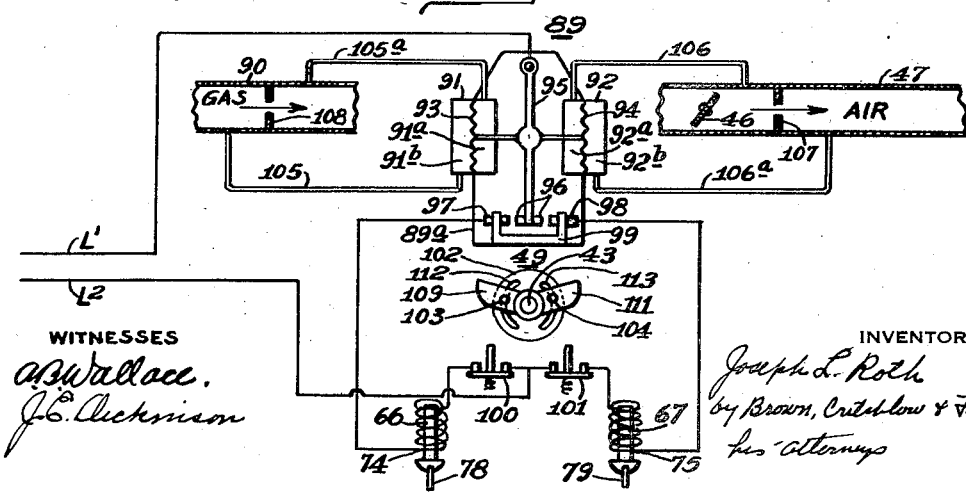

For automatically and selectively controlling the operation of the solenoids 66 and 67 to thereby govern the effective operation of the regulator, a source of current supply designated by the lines $L_1$ and $L_2$ is provided therefor, and, as shown in Fig. 10, is connected to the solenoids through the limit switch 49 and a pressure responsive regulator switch 89. This latter switch, which may be made in various well known ways, comprises, as illustrated, a pair of sealed containers 91 and 92 mounted on a support 89a. In these containers there is arranged a pair of flexible diaphragms 93 and 94, respectively, which divides them each into two pressure chambers 91a and 91b and 92a and 92b. These diaphragms are connected to a pendulum-like rod 95 pivotally suspended from its upper end from the support 89a and equipped at its lower end with a circuit-making bridging member 96. Operatively associated with this circuit bridging member 96 to which one side L₁ of the source of current supply is connected, is a pair of contact or terminal posts 97 and 98, respectively. One of these is connected to one side of the solenoid 66 and the other to the corresponding side of the solenoid 67, the opposite sides of the solenoids being connected respectively to a pair of normally closed spring actuated switches 100 and 101 comprising a part of the limit switches 49. These spring switches are in turn connected in common to the opposite side of the source of power supply or to line conductor L₂.

To control the operation of the regulator switch 89 the pressure chambers 92a and 92b of the container 92 are connected by a pair of conduits 106 and 106a to the air conduit 47 at opposite sides respectively of an orifice 107 provided in such conduit. In this way the diaphragm 94 is rendered responsive to the flow of air passing through this conduit. In a like manner the pressure chambers 91a and 91b formed by the diaphragm 93 in the container 91 are connected by a pair of conduits 105 and 105a to the fuel supply conduit 90 at opposite sides of an orifice 108 located in the latter conduit. With this arrangement, due to its connection with the diaphragms 93 and 94, the contact carrier 95 is rendered directly responsive to the ratio of flow in the fuel and air conduit, the proportion of flow of which it is desired to regulate.

The limit switch 49 which is utilized to limit the extent of movement in both directions of the regulating valve 46 comprises, as shown best in Figs. 1, 3 and 10, a pair of normally closed simple spring biased switches 100 and 101 which are connected in common to line conductor L₂ and in series to solenoids 66 and 67. For opening the switches 100 and 101 so that the circuit established by the regulator switch 89 can not cause the valve 46 to be moved beyond a desired point, a pair of operating cams 109 and 111 is mounted on a disc 102 keyed to the regulator shaft 43 and disposed to engage and open the bridging members of such switches 100 and 101 when moved into contact therewith. In opening, these switches, of course, deenergize the solenoids to which they are connected and consequently thereby release the brakes with which they are associated. In order that the cams 109 and 111 may be adjusted to vary the position the valve 46 will be in when the switches 100 and 101 are opened, they are loosely mounted on the shaft 43 and connected to the disc 102 by bolts 103 and 104 disposed in circular openings 112 and 113 cut in such disc.

The operation of this embodiment of the invention may be described as follows. When the solenoids 66 and 67 are both deenergized, which is the case when the fuel and air flow to the combustion chamber is in the desired proportion, or in the proportion which the regulator is intended to maintain although the motor 9 and shaft 7 are operated continuously, as they normally are, there is no movement of the driven shaft 29 of the regulator or the regulator shaft 43. Under such conditions the gear 18 which is keyed to the reduced portion 14 of the drive shaft 7 causes the gears 19 and 22 carried by the shafts 21 journaled in the gear ring 15 to be rotated about their axes. They in turn rotate the freely movable ring gear 11 about the bearing sleeve 6 and the gears 23 about their supporting shafts 24. Under such circumstances the gear ring 15 is prevented from turning by its connection with the driven shaft 29 which requires power to rotate it due to its connection by the gears 41 and 42 to the valve 46 and no power is communicated thereto as the gears journaled in the gear ring 15 are turning freely. As will presently appear, rotation of shaft 29 in either direction is accomplished only when the gears journaled in the gear ring 15 are forced to rotate about a gear held stationary by the braking mechanism as described hereinbefore. When both of these gears are free to rotate, the ring gear 15 receives no power tending to rotate it. The gears 23 on turning cause the long-faced gears 25 meshed therewith to rotate, and they in turn rotate the gear 27 and the other gear ring 30 to which the latter gear is keyed. The rotation of this latter gear ring causes the gears 32 carried by it to rotate about the fixed gear 34 formed on the bearing sleeve 31 and they in turn cause the ring gear 36 to be rotated about the bearing sleeve 31 on which it is loosely mounted. Thus the movement of the shaft 7 is communicated to the two freely movable ring gears 11 and 36 without rotating the driven shaft 29.

Whenever an unbalanced condition of flow develops in the two pipes 90 and 47, the pressure or flow-responsive contactor 89 is actuated to rectify such condition by moving the pendulum 95 into contact with one or the other of the terminals 97 or 98, depending on which diaphragm 93 or 94 is most affected. If the gas flow is too large the pendulum is operated to energize the solenoid 67. This causes the lever 77 to be lifted and gear rack 54 to be engaged with the brake gear 52 on the ring gear 36. Under such conditions the ring gear 36 is also prevented from rotating due to the gear 34 being a fixed gear. With the gear ring 36 held against rotation, so also is the gear 27, and as a result the rotation of the gears 25 produced by the gears 19 through the medium of the gears 22 and 23, causes the gear ring 15 and the driven shaft 29 keyed to its hub 16 to be rotated in the opposite direction to the direction of rotation of the drive shaft 7 and as a result the valve 46 is rotated in a direction to increase the air flow. As soon as a balanced condition is in this way reestablished the pendulum 95 is moved away from the terminal 98 and the gear rack 54 with the deenergizing of the solenoid 67 released by gravity, causing the rotation of the driven shaft 29 to cease.

In case the gas flow fails or falls below the predetermined air pressure balance, the pendulum 95 is operated in the opposite direction to that just described and the terminal 97 engaged by it, causing the solenoid 66 to be energized. This solenoid on being energized causes the gear rack 53 to be engaged with the brake gear 51 and the ring gear 11 to be stopped. With the stopping of this gear the gears 19 are forced to travel around it as they are rotated by the shaft 7. This results in the gear ring 15 and the driven shaft 29 being rotated in the same direction as the drive shaft 7. Consequently the valve 46 under such circumstances is closed. As previously described, when the balanced condition is reestablished in the flow lines in this way the pendulum is moved away from the terminal 97 and the solenoid 66 deenergized, permitting the gear rack 53 to release itself and cause the rotation of the driven shaft 29 and the valve 46 to cease.

Should the regulator switch 89 attempt to maintain either of the solenoid circuits closed long enough for the regulator to rotate the valve 46 beyond a desired limit such circuit will be opened by the associated cams 109 or 111 on the limit switch 49 which opens the switches 100 or 101 included in such solenoid circuit. In this way the limit of movement of the valve is definitely determined, although such control may be omitted if unnecessary.

A feature of this regulator is that the gears in the reversible planetary gear unit are so designed as to cause the driven shaft 29 to be operated at the same speed in both directions and also at a speed which is lower than that of the drive shaft. This, as will be appreciated, provides uniform balancing in both directions, which is desirable. It will be understood, however, that the speed ratios may be varied by varying the ratio of the gears in the unit.

Another, and an outstanding, feature of the invention is the sensitivity and accuracy with which the regulator which is exceedingly sturdy and dependable may be operated. This latter feature will be best appreciated when it is considered that the driving motor is operated continuously and that the driven shaft 29 will be started and stopped immediately upon the actuation and release of the brakes due to the small momentum in the driven parts and the locking effect of the worm gear connection, and if another form of regulator connection is employed such operation may be insured by simply applying a brake to the driven shaft 29 and controlling its operation by the break-actuating mechanism.

It will also be appreciated from the foregoing by those skilled in the art that both the structure of the control elements and the connection of the regulator proper to the element to be regulated may be greatly modified without departing from the spirit of this invention, all of which is contemplated by the appended claims.

I claim:

1. A regulator comprising a regulating element, a continuously operated motor for selectively actuating said element, a planetary gear unit interposed between and disposed to connect said motor to said regulating element, and means responsive to the condition controlled by said regulating element for connecting it to and disconnecting it from said planetary gear unit.

2. A regulator comprising a regulating element, a continuously operated motor for actuating said regulating element, a planetary gear unit for connecting said motor to said regulating element, said planetary unit having a constant input and a selectively controlled reversible output, means for controlling the output of said unit, and selectively operable means responsive to the conditions controlled by said regulating element for governing the operation of the output or regulating element controlling means.

3. A regulator comprising a regulating element, a continuously operated motor for actuating said element, a planetary gear unit for connecting said motor to said regulating element and adapted to normally effect no movement of said regulating element, and selectively operable means responsive to the conditions controlled by said regulating element for connecting said planetary gear unit to operate said regulating element in either direction.

4. A regulator comprising a regulating element, a continuously operated motor for actuating said regulating element, a planetary gear unit provided with a drive shaft connected to said motor and a normally inoperative driven or output shaft operably connected to said regulating element, means for controlling the operation of said planetary unit which is adapted to determine both the movement and direction of movement of said driven shaft, and selectively operable means responsive to the conditions controlled by said regulating element for governing said planetary gear unit controlling means.

5. A pressure regulator comprising a regulating element, a continuously operated motor for actuating said regulating element, a planetary gear transmission provided with a driving shaft connected to said motor and a reversible but normally inoperative driven shaft operably connected to said regulating element, means in said transmission for controlling the movement and direction of movement of said driven shaft, and pressure operated means responsive to the conditions controlled by said regulating element for governing the operation of said transmission controlling means.

6. A pressure regulator comprising a regulating element, a continuously operated motor for actuating said regulating element, a planetary gear unit provided with a driving shaft connected to said motor and a reversible but normally inoperative driven shaft operably connected to said regulating element, means in said planetary unit for controlling the movement and direction of movement of said driven shaft, pressure responsive means for governing the operation of said planetary gear unit controlling means, and means automatically determining the limit of movement of said regulating element in either direction.

7. A pressure regulator comprising a planetary gear unit equipped with a single drive shaft releasably connected to a normally inoperative driven shaft, a continuously operable motor connected to said drive shaft, a regulating element operably coupled to said driven shaft, means for selectively connecting said drive shaft to said driven shaft to rotate the latter in either direction, and means responsive to the conditions controlled by said regulating element for controlling the operation of said selecting means.

8. A pressure regulator comprising a planetary form of gear unit equipped with a drive shaft releasably connected to a normally inoperative driven shaft, a continuously operable motor connected to said drive shaft, a regulating element operably coupled to said driven shaft, means for selectively connecting said drive shaft to said driven shaft to rotate the latter in either direction, automatically operated control means for controlling the operation of said selecting means, and means actuated by said driven shaft for automatically determining maximum movement of said regulating element in opposite directions.

9. A pressure regulator comprising a planetary gear unit equipped with a single drive shaft releasably connected to a normally inoperative driven shaft by means selectively capable of effecting rotation of the driven shaft in opposite directions at the same relative speed to the drive shaft, a continuously operated motor connected to said drive shaft, a regulating element connected to said driven element, and means responsive to the conditions controlled by said regulating element for controlling the operation of said selecting means.

10. A regulator comprising a planetary gear unit equipped with a drive shaft releasably connected to a normally inoperative driven shaft by means selectively capable of effecting rotation of said driven shaft in the same and opposite direction to that of the drive shaft, a continuously operated motor connected to said drive shaft, a regulating element operably coupled to said driven shaft, electro-magnetic means for controlling the rotation and direction of rotation of said driven shaft, a source of current supply for operating said electro-magnetic means, and a pressure operated switch connected to said current supply in circuit relation with said electro-magnetic means for controlling the operation of the latter.

11. A regulator comprising a regulating element, a continuously operated motor for selectively actuating said element, a planetary gear unit interposed between and connecting said motor to said regulating element and comprising a drive shaft, an internal ring gear loosely mounted for movement relative to and concentric with said drive shaft, a gear mounted on and keyed to said drive shaft, an intermediary gear disposed to engage said latter gear and said internal gear, a driven shaft mounted in alignment with said drive shaft, a gear supporting element keyed to said driven shaft, a shaft keyed at one end to said intermediary gear mounted in said gear supporting element, a gear keyed to the opposite end of said latter shaft, a gear train comprising two meshed gears mounted on shafts journaled in said gear supporting element in meshed relation with said last-mentioned gear, a second gear supporting element loosely mounted on said driven shaft, a gear keyed to said latter element and meshed with the last gear in said gear train, a second internal ring gear loosely mounted for rotation about said driven shaft, a fixed gear mounted concentrically with respect to said driven shaft in radial alignment with said second ring gear, a gear mounted on a shaft journaled in said second gear supporting element and disposed to mesh with said second ring gear and said fixed gear, braking means for releasably preventing the rotation of said ring gears to thereby control the movement and direction of rotation of said driven shaft, and means responsive to the condition controlled by said regulating element for controlling the movement thereof produced by said planetary gear unit.

12. A regulator comprising a regulating element, a continuously operated motor for selectively actuating said element, a planetary gear unit interposed between and connecting said motor to said regulating element and comprising a drive shaft, an internal ring gear loosely mounted for rotation about said shaft, a gear mounted on and keyed to said shaft in radial alignment with said ring gear, a plurality of intermediary gears disposed to mesh with said latter gear and said ring gear, a driven shaft mounted in alignment with said drive shaft, a gear supporting element mounted on and keyed to said latter shaft, a plurality of shafts keyed at the end to said intermediary gears and journaled in said elements, gears keyed to the opposite end of each of said latter shafts, a plurality of gear trains consisting each of two meshed gears mounted on shafts journaled in said gear supporting element with one gear of each train meshed with one of the gears on said intermediary gear supporting shafts, a second gear supporting element loosely mounted on said driven shaft, a gear keyed to said latter element which is meshed with the end gear of each of said trains of gears, a fixed gear mounted concentric with said driven shaft, a second internal ring gear mounted for rotation about said drive shaft in radial alignment with said fixed gear, a plurality of intermediary gears mounted on shafts journaled in said second gear supporting element in mesh with said fixed gear and said second ring gear, means for selectively preventing the rotation of either of said rings gears to control the rotation and direction of rotation of said driven shaft, said driven shaft being operably connected to said regulating element and means responsive to the condition controlled by the regulating element for controlling the movement thereof produced by said planetary gear unit.

13. A regulator comprising a regulating element, a continuously operated motor for selectively actuating said element, a planetary gear unit interposed between and connecting said motor to said regulating element and comprising a drive shaft releasably connected to a driven shaft by means adapted to selectively effect rotation of said driven shaft in opposite directions and at the same relative rotary speed to the speed of said drive shaft, means operably connecting said driven shaft to said regulating element and means responsive to the condition controlled by said regulating element for controlling the operation of said selecting means.

14. A pressure regulator comprising a planetary unit equipped with a single power input shaft connected to a continuously operated motor and releasably connected to a reversible normally inoperative power output shaft, means for selectively connecting said input shaft to said output shaft to rotate the latter in the same and opposite direction to that of the input shaft, a regulating element coupled to said output shaft, and pressure controlled means for controlling the operation of said selective connecting means.

JOSEPH L. ROTH.